US010461996B2

(12) United States Patent
Griswold et al.

(10) Patent No.: US 10,461,996 B2
(45) **Date of Patent: *Oct. 29, 2019**

(54) SERVICE FAILOVER AND FAILBACK USING ENTERPRISE SERVICE BUS

(71) Applicant: International Business Machines Corporation, Armonk, NY (US)

(72) Inventors: Douglas Edmund Griswold, Apex, NC (US); Charles William Price, II, Harrisburg, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/619,973

(22) Filed: Jun. 12, 2017

(65) Prior Publication Data

US 2017/0279661 A1 Sep. 28, 2017

Related U.S. Application Data

(63) Continuation of application No. 13/766,767, filed on Feb. 13, 2013, now Pat. No. 9,755,889.

(51) Int. Cl.
*G06F 11/00* (2006.01)
*H04L 12/24* (2006.01)

(52) U.S. Cl.
CPC ........ *H04L 41/069* (2013.01); *H04L 41/0663* (2013.01); *H04L 41/0677* (2013.01)

(58) Field of Classification Search
CPC ............... G06F 11/201; G06F 11/2025; G06F 11/2092; G06F 11/1076; H04L 67/1097; H04H 41/0806; H04H 41/0813; H04H 41/082; H04H 41/0883
See application file for complete search history.

(56) References Cited

U.S. PATENT DOCUMENTS 4,872,106 A * 10/1989 Slater ...................... G06F 11/14 714/13
5,564,054 A * 10/1996 Bramnick ............ G06F 9/4411 713/2
5,852,724 A * 12/1998 Glenn, II ............... H04L 29/06 709/239
6,108,300 A * 8/2000 Coile ................. G06F 11/2005 340/2.9

(Continued)

OTHER PUBLICATIONS

Appendix P, 2017.

*Primary Examiner* — Bryce P Bonzo
*Assistant Examiner* — Jeison C Arcos
(74) *Attorney, Agent, or Firm* — Garg Law Firm, PLLC; Rakesh Garg; James Nock

(57) ABSTRACT

A method, system, and computer program product for service failover and failback using ESB are provided in the illustrative embodiments. A determination is made, by a processor at a first data processing system, whether a service being requested in a request can be provided from a failover provider system. An event log record is used to determine whether a connection failure event occurred with a primary provider system of the service. An evaluation is made whether the request can be routed to the failover provider system. The request is routed to the failover provider system.

19 Claims, 10 Drawing Sheets

START
550
RECEIVE A WEB SERVICE REQUEST INCLUDING THE SERVICE IDENTIFIER 552
RECEIVE OR RETRIEVE A POLICY/ REGISTRY APPLICABLE TO THE SERVICE 554
FAILURE ADDRESS DEFINED? 556
LOOK UP EVENT LOGS AND RETRIEVE CONNECTION FAILURE EVENTS FOR THE SERVICE 584
FAILURE TTL EXPIRED? 586
INCREMENT FAILURE EVENTS COUNT 588
MORE CONNECTION FAILURE EVENTS FOR THIS SERVICE? 570
YES
NO
ROUTE THE REQUEST TO THE PRIMARY ADDRESS 558
FAILURE EVENTS COUNT EXCEEDS THRESHOLD? 572
WILL USE OF FAILURE ADDRESS EXCEED A THRESHOLD NUMBER OF HOPS? 574
ERROR WITH PROVIDER? 560
ROUTE TO FAILURE ADDRESS 576
PROCESS THE REQUEST TO A RESPONSE 562
END
PERFORM ERROR PROCESSING 578

(56) References Cited

U.S. PATENT DOCUMENTS 6,581,166 B1 * 6/2003 Hirst ...................... H04L 69/08
714/4.4
9,755,889 B2 * 9/2017 Griswold ............. H04L 41/069
2002/0133735 A1 * 9/2002 McKean ............ G06F 11/2092
714/5.11
2003/0126315 A1 * 7/2003 Tan ...................... G06F 11/201
710/1
2006/0187906 A1 * 8/2006 Bedi .................. G06F 11/2028
370/352
2006/0212453 A1 * 9/2006 Eshel ................. G06F 11/2025
2007/0058529 A1 * 3/2007 Valdes ............... G06F 11/2007
370/225
2007/0239944 A1 * 10/2007 Rupanagunta ........ G06F 3/0613
711/147
2014/0229606 A1 * 8/2014 Griswold ............. H04L 41/069
709/224

* cited by examiner

100
CLIENT 114
CLIENT 110
CLIENT 112
CONSUMER 136
NETWORK 102
GATEWAY 134
132
PROVIDER 135
SERVER 104
142
STORAGE 108
CONSUMER 146
PROVIDER 145
SERVER 106
GATEWAY 144

SERVICE PROVIDER
LOCATION B 332
BACKUP PROVIDER 336
CONSUMER B 338
GATEWAY B 334
EVENT LOG B 342
REGISTRY B 340
360
FIREWALL 331
SERVICE BUS 330
EVENT LOG A 312
REGISTRY A 310
362
GATEWAY A 304
LOCATION A 302
PRIMARY PROVIDER 306
CONSUMER A 308

```
<entry>
      <url-path>/foo/bar/baz</url-path>
      <inbound secZone="IEB-BZ">
422             <primaryAddress servedBy="ieb.pok.ibm.com">
    http://whiteant.pok.ibm.com/foo/bar/baz </primaryAddress>
424             <failoverAddress servedBy="ieb.bld.ibm.com" failoverThreshold="3"
    failoverTTL="20"> http://whiteant.bld.ibm.com/foo/bar/baz ></failoverAddress>
                <protocol idRealm="ED"
uri="ldaps://bluepages.ibm.com:636">http</protocol>
                <protocol idRealm="ED"
uri="ldaps://bluepages.ibm.com:636">https</protocol>
      </inbound>
</entry>
```

```
<xsl:when test="$dpErrorCode='0x01130006' or $dpErrorCode='0x01130007' or
$dpErrorCode='0x01130008'
            or $dpErrorCode='0x01130009' or
$dpErrorCode='0x01130011' or $dpErrorCode='0x01130019'
            or $dpErrorCode='0x0113001c' or
$dpErrorCode='0x0113001e' or $dpErrorCode='0x00c3000f'">
        <!-- EXPERIMENTAL 08/06/2012 LOG BACKEND HA ERRORS -->
        <xsl:variable name="policy-node">
        <xsl:call-template name="getPolNode"/>
        </xsl:variable>

        <xsl:message dp:type="ConnFailure" dp:priority="error">
            <uri><xsl:value-of
select="$policy-node/entry/url-path/text()"/></uri>
            <ttl><xsl:value-of
select="$policy-node/entry/failoverTTL/text()"/></ttl>
            </xsl:message>
...
```

```
</log-entry>
    <log-entry serial='67' domain='dp_Common'>
    <date>Fri Aug 24 2012</date>
    <time utc='1345836142920'>19:22:22</time>
    <date-time>2012-08-24T19:22:22</date-time>
    <type>ConnFailure</type>
    <class>mpgw</class>
    <object>RSMProcessor</object>
    <level num='3'>error</level>
    <transaction-type>error</transaction-type>
    <transaction>12952050</transaction>
    <client>9.23.220.112</client>
    <code>0x80000001</code>
    <file></file>
    <message>
        <uri>/foo/bar/baz</uri>
        <failoverTTL>20</failoverTTL>
    </message>
</log-entry>
```

SERVICE FAILOVER AND FAILBACK USING ENTERPRISE SERVICE BUS

TECHNICAL FIELD

The present invention relates generally to a method, system, and computer program product for improving web-services reliability in a data processing environment. More particularly, the present invention relates to a method, system, and computer program product for service failover and failback using Enterprise Service Bus or Backbone.

BACKGROUND

A services-based enterprise data processing environment comprises providers of services and consumers of those services. A service, also known as a web-service, is a function or functionality implemented in software, provided or hosted from a hardware data processing system, and made available over a data network for use by another hardware or software component. A provider system or component, which may be a combination of hardware and software, provides a service. A consumer system or component, which may also be a combination of hardware and software, uses or consumes the service. For example, a consumer component may itself be a service.

An Enterprise Service Bus (ESB) is a modular, component based architecture interconnecting consumer components with provider components through a collection of other components. These other components collectively form a part of the ESB. Some of these components operate as commodities and are consumed by other services.

The endpoint components, such as the consumers and the providers, direct all requests and deliver all responses through the ESB. Typical functions of the ESB are, for example, to enforce compliance with security policies, to perform message mediation, and to reduce the number of point-to-point connections between applications.

SUMMARY

The illustrative embodiments provide a method, system, and computer program product for estimating the time needed to model a data processing environment. An embodiment determines, by using a processor at a first data processing system, whether a service being requested in a request can be provided from a failover provider system. The embodiment uses an event log record to determine whether a connection failure event occurred with a primary provider system of the service. The embodiment evaluates whether the request can be routed to the failover provider system. The embodiment routes the request to the failover provider system.

Another embodiment includes one or more computer-readable tangible storage devices. The embodiment includes program instructions, stored on at least one of the one or more storage devices, to determine, by using a processor at a first data processing system, whether a service being requested in a request can be provided from a failover provider system. The embodiment includes program instructions, stored on at least one of the one or more storage devices, to use an event log record to determine whether a connection failure event occurred with a primary provider system of the service. The embodiment includes program instructions, stored on at least one of the one or more storage devices, to evaluate whether the request can be routed to the failover provider system. The embodiment includes program instructions, stored on at least one of the one or more storage devices, to route the request to the failover provider system.

Another embodiment includes one or more processors, one or more computer-readable memories and one or more computer-readable tangible storage devices. The embodiment includes program instructions, stored on at least one of the one or more storage devices for execution by at least one of the one or more processors via at least one of the one or more memories, to determine, by using a processor at a first data processing system, whether a service being requested in a request can be provided from a failover provider system. The embodiment includes program instructions, stored on at least one of the one or more storage devices for execution by at least one of the one or more processors via at least one of the one or more memories, to use an event log record to determine whether a connection failure event occurred with a primary provider system of the service. The embodiment includes program instructions, stored on at least one of the one or more storage devices for execution by at least one of the one or more processors via at least one of the one or more memories, to evaluate whether the request can be routed to the failover provider system. The embodiment includes program instructions, stored on at least one of the one or more storage devices for execution by at least one of the one or more processors via at least one of the one or more memories, to route the request to the failover provider system.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4B depicts an example entry in a registry in accordance with an illustrative embodiment;

FIG. 4D shows logic for emitting connection error entries from an ESB to an event log in accordance with an illustrative embodiment;

FIG. 4E depicts an example connection error event log entry generated by an error processing component in an ESB in accordance with an illustrative embodiment;

DETAILED DESCRIPTION

Figure 1:
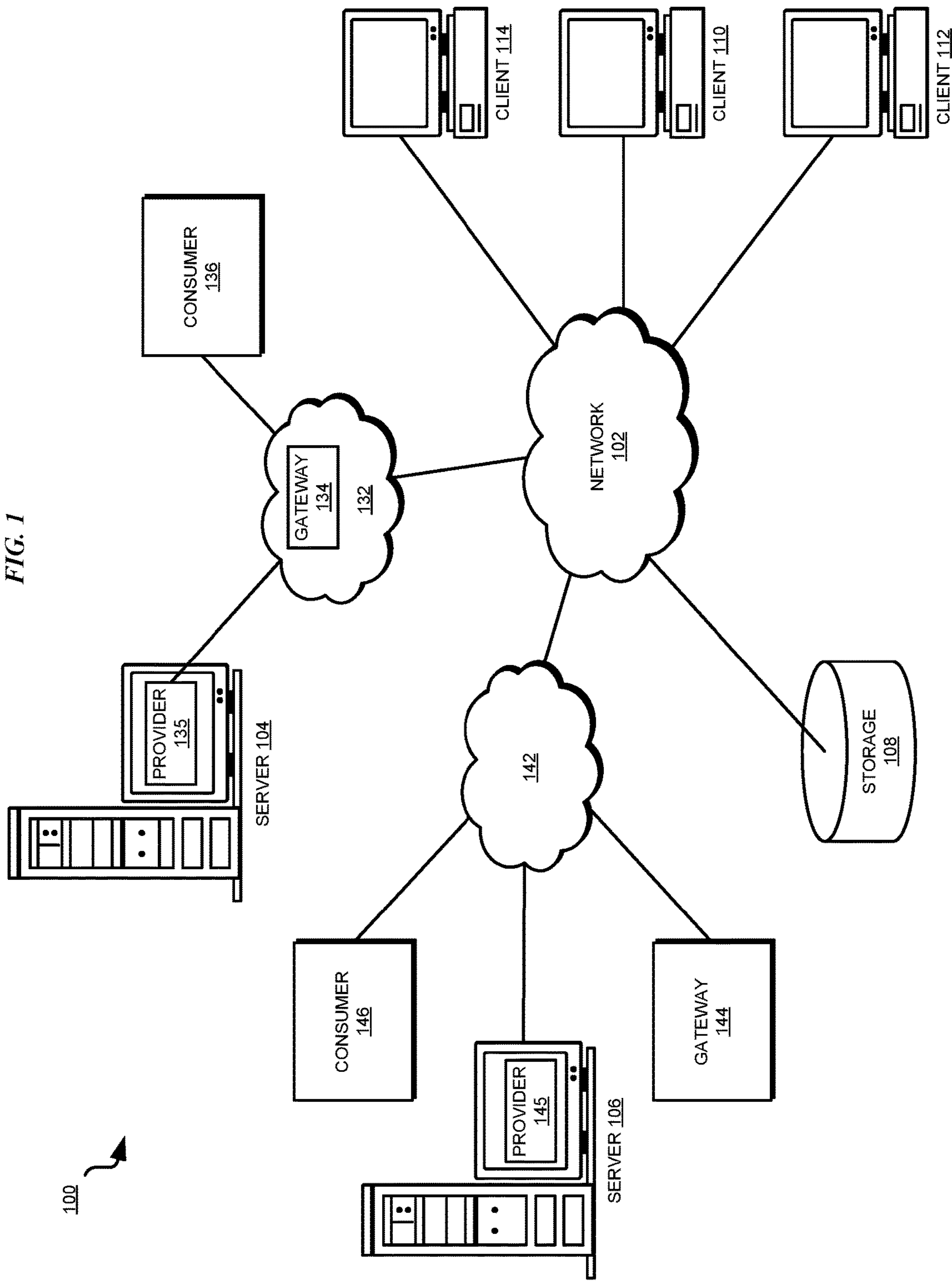
FIG. 1 depicts a pictorial representation of a network of data processing systems in which illustrative embodiments may be implemented.

A provider failing to provide a requested service can lead to a disruption in the enterprise. The illustrative embodiments recognize that the commodity services that are a part of the ESB, even when not business-critical themselves, can also lead to significant disruption in the enterprise when they are unavailable to the ESB.

The illustrative embodiments recognize that absence of an efficient and lightweight mechanism to trigger a secondary path for service continuity in the present architectures is a significant problem. The presently available solutions suffer from significant drawbacks in providing failover and failback facility in a service-based enterprise.

For example, a Domain Name server (DNS) DNS based Global Server Load Balancing (DNS GSLB) solution employs an external device which communicate with web services providers such as J2EE application servers or PHP servers, in multiple geographies and/or security zones to determine which service instances are best prepared to receive requests from consumers. Where redundant providers are present in a primary/backup configuration, the GSLB returns an IP address of a provider, usually the primary provider, as the preferred cluster IP address to the DNS. GSLB DNS responses are cached at the DNS server where they can be used by consumers until a Time To Live (TTL) associated with the preferred cluster IP address expires. The TTL is typically set by GSLB to correspond to a health check interval.

The illustrative embodiments recognize that such a DNS GSLB solution suffers from several significant problems. For example, the illustrative embodiments recognize that the GSLB devices constitute added failure points in the enterprise; the solution requires additional network traffic to complete DNS resolution and to perform health checking with primary and backup clusters; and a primary failure within the TTL still results in numerous failed consumer requests for high volume web services. Furthermore, for browser based applications, a local DNS cache at a consumer cannot observe the TTL directly. Accordingly, for a consumer operating in this solution, the local DNS cache may use long default cache timeouts, defeating the fundamental principle of operation of the solution.

To overcome these problems, many GSLB devices return very short TTLs, some returning TTLs of zero seconds, in an attempt to reduce or disable caching of the GSLB response. This work-around increases DNS traffic on the network, and, in cases where the local DNS cache cannot or does not observe the TTL, there is little or no improvement. As a result, the consumer may not be redirected to the backup cluster for a long period following a primary cluster failure.

Additionally, a health check simulates a real request but there are almost always compromises made to create a somewhat realistic simulation. When a health check simulation fails, it may or may not indicate that a corresponding provider service has failed. Also, the health checks introduce additional network and CPU overhead in the enterprise data processing environment. These problems with the DNS GSLB solution make the solution unacceptable for high volume web service applications.

Another presently available solution, IP Address Takeover, is a failover mechanism that uses a floating IP address to move traffic destined for the failing (primary) node to a network interface card (NIC) on the hot-standby (backup) node. This occurs when the hot-standby determines that the primary node has failed, normally through a secondary heartbeat channel connecting the two nodes. The secondary server is configured with a second logical interface using an IP alias on an existing physical interface or NIC. IP address takeover begins when the hot-standby brings up the interface for the floating address, normally because the heartbeat between the primary and hot-standby has been lost.

This strategy relies on the ARP (address resolution protocol) cache of the consumer node, which holds a mapping between the IP Address of the web service to a hardware (MAC) address on the network. If the primary node web service process has failed but is still able to respond to ARP requests flowing over the network, a race condition between the primary and hot-standby node will occur whenever a consumer issues an ARP request to refresh the consumer's cache. Some consumers may receive the MAC address of the hot-standby, but others could continue to receive the MAC address of the failed primary. Even when the primary fails completely, i.e. the primary is unable to respond to ARP requests, consumers will continue to send requests to the failed node until their local ARP caches expire.

To ensure hard failover to the standby node, a technique known as gratuitous ARP is used in this existing solution. ARP responses are normally sent in response to a consumers ARP request, such as, "what is the hardware address of the node with IP address 1.1.1.1?" In gratuitous ARP, an address resolution is generated to the network broadcast address when there was no ARP request. If the hot-standby generates the gratuitous ARP frequently enough, and if all of the hosts on the network receive the ARP reply and refresh their caches ARP requests for the floating IP can be eliminated and the hot-standby can ensure that it will receive all traffic previously destined for the failed primary.

The illustrative embodiments recognize that the IP address takeover solution suffers from several significant problems. For example, the illustrative embodiments recognize that the floating IP Address, in many network topologies, forces the primary and hot-standby (backup) to the same network segment. Furthermore, gratuitous ARP is dependent on router and server behaviors, which are not always controllable or predictable. For example, routers can be configured to ignore gratuitous ARP, and many network configurations regard gratuitous ARP as a suspicious network traffic pattern, and may flag or inhibit their transmission, such as in secure environments. IP Address Takeover without gratuitous ARP is ineffective as a failover mechanism. The illustrative embodiments recognize that IP Address Takeover is a brute force technique that can produce inconsistent results and may present significant security concerns in some environments. In most cases, IP address takeover solution cannot provide a failover solution where geographic separation of the primary and backup nodes is a requirement.

In another presently available solution, the High Availability (HA) cluster solution, a failing node is automatically and quickly replaced by another node. In active-passive HA cluster arrangement, only one node is running and providing service at a time and the other nodes are in standby mode. A high-availability cluster software application manages the HA cluster, monitors service availability, and manages the switching of the service from one cluster node to another. Although the switchover is transparent to the consumer, in some cases, the application service must be aware of the HA cluster software.

HA cluster software uses a combination of service monitoring and node monitoring to determine if the service should be moved to another node. In general, if the service becomes nonresponsive, the active node will initiate a failover to the passive node. If resources, required by the service (e.g. memory, CPU, storage), become degraded, the active node may preemptively initiate a failover to the passive node. The passive node may also monitor the status of the active node through a private heartbeat channel. If the passive node believes that the active node has failed, it may attempt to take over the service itself.

When the passive node acts preemptively, the passive node attempts to kill all processes on the active node to reduce the likelihood of a resource or network conflict. In some HA cluster solutions, the standby may even attempt to cut power to the active node through smart network attached power supplies (PSUs). The passive node then begins taking over the application resources, starts the service processes, and finally initializes the public network interface making the virtual (or cluster) IP address of the service available to the network.

The illustrative embodiments recognize that the active-passive HA cluster solution, the most complex of the existing solutions, presents special problems. For example, this solution relies on special HA clustering software for management of the shutdown and takeover processes. The application software (services) may require modifications to make them aware of the HA cluster software. IP duplication may result when the active node cannot be forced off the network. The solution relies on special hardware (e.g. networked PSUs) or other brute-force techniques to remove the failed node(s) from the network. As with other solutions use of a service cluster IP address makes geographical separation of primary and secondary nodes complex, or may preclude such separation altogether.

A solution is needed to provide end-to-end service continuity through the ESB, which requires no special hardware or software at the endpoints, which does not depend on consumer application or operating system behaviors, and which places no suspicious traffic or presents real or apparent risk to the networks. Furthermore, because a principle objective of the ESB is to provide endpoint service virtualization, the illustrative embodiments recognize that such a service recovery solution should also be native to the operation of the ESB.

The illustrative embodiments used to describe the invention generally address and solve the above-described problems and other problems related to the managing service reliability in a data processing environment. The illustrative embodiments provide a method, system, and computer program product for service failover and failback using ESB. The illustrative embodiments provide a low cost, lightweight, and efficient mechanism for utilizing provider endpoint redundancy on the ESB.

An embodiment advantageously provides automatic failover to a secondary provider in the event of a network or application server outage, with automatic failback to the primary provider. An embodiment also provides a higher availability option for non-business critical applications, components, or services, which cannot afford the cost of a disaster recovery solution. An embodiment further provides added failover and failback flexibility during maintenance time periods.

The illustrative embodiments detect communications failures while propagating web services requests through the ESB, and automatically activates a backup communication path to improve service availability. The illustrative embodiments further restore service following the failure of the primary cluster in a primary/backup application architecture. The illustrative embodiments accomplish this failover and failback without reliance on problematic DNS and ARP mechanisms or other brute force techniques, and without the need for special hardware or software, or independent health checking or heartbeat overhead.

The illustrative embodiments are described with respect to certain components of an enterprise data processing environment only as examples. Any specific manifestations of such components, such as of a gateway to manage request processing in a given security domain or network domain, are not intended to be limiting to the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
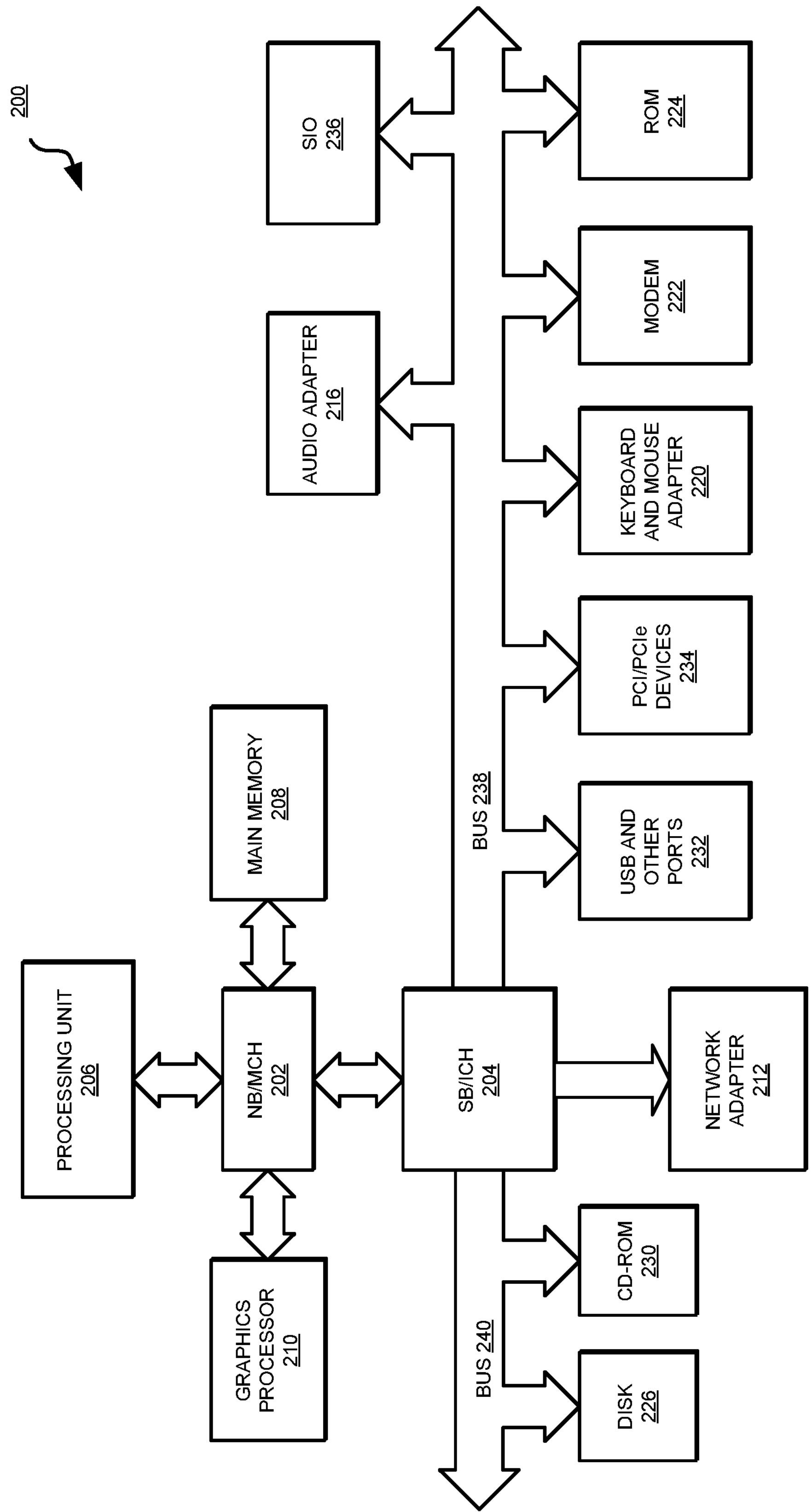
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114, may contain data and may have software applications or software tools executing thereon.

Only as an example, and without implying any limitation to such architecture, FIG. 1 depicts certain components that are usable in an example implementation of an embodiment. For example, provider 135 and consumer 136 communicate using an ESB (not shown) in security or network domain 132. Gateway 134 forms a part of the ESB and operates in the manner of an embodiment described herein. Similarly, provider 145 and consumer 146 communicate using the ESB in security or network domain 142. Gateway 144 forms a part of the ESB and operates in the manner of an embodiment described herein. Consumer 136 accesses provider 145, or consumer 146 accesses provider 135, using gateways 134 and 144 in the manner of an embodiment. Gateway 134 and 144 can be implemented in any manner suitable for an implementation without limitation. For example, in one embodiment, gateway 134 is a software implementation executing on some hardware, even as a service, and gateway 144 is implemented as a combination of hardware and software, such as in firmware.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, files related to the operating system and other software applications, and applications to clients 110, 112, and 114. Clients 110, 112, and 114 may be clients to server 104 in this example. Clients 110, 112, 114, or some combination thereof, may include their own data, boot files, operating system images, files related to the operating system and other software applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. A computer readable or usable storage device does not include propagation media. Hard disk drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as estimation application 105, analysis application 107, and application 113 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
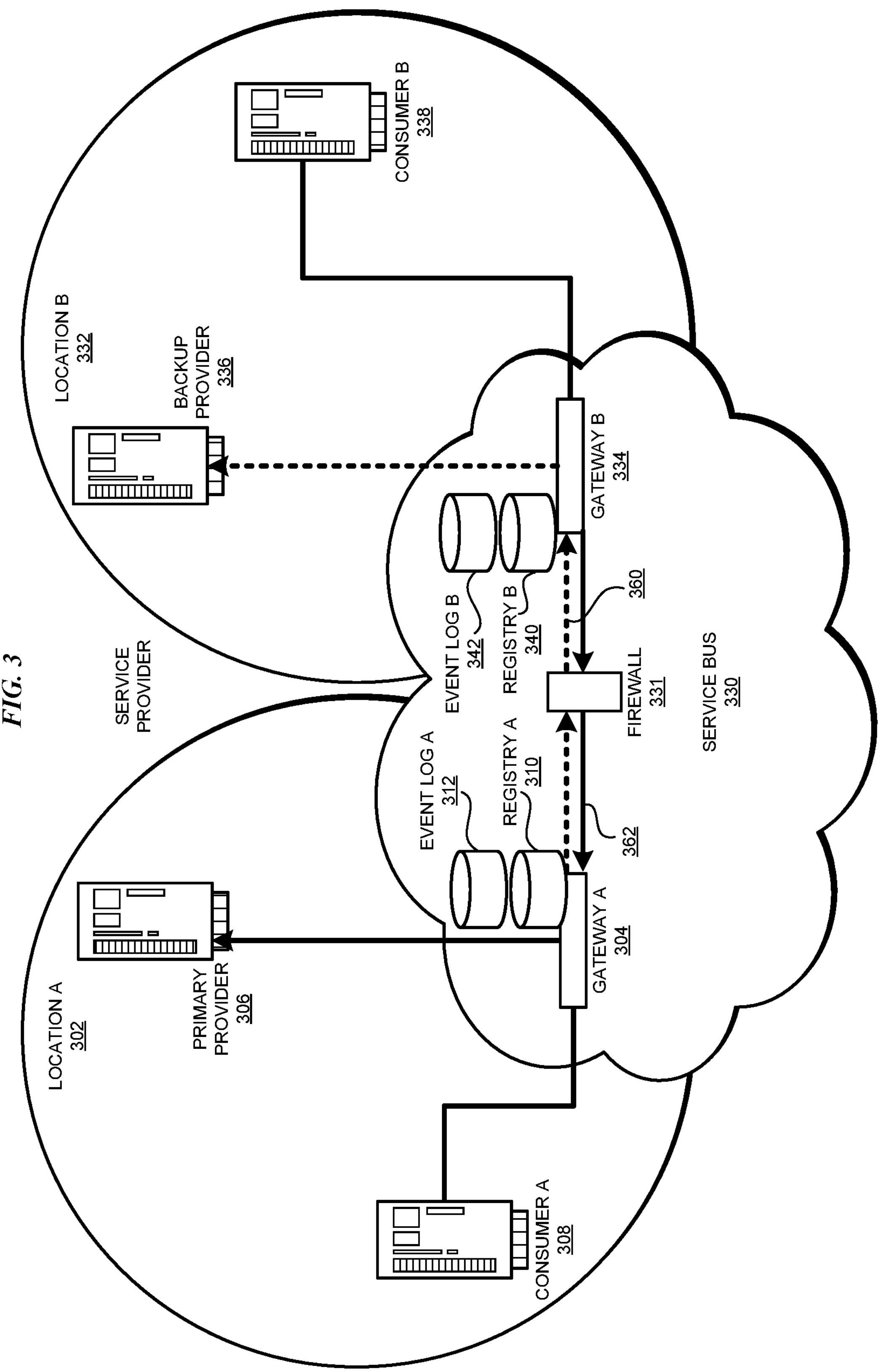
FIG. 3 depicts a block diagram of example configuration for service failover and failback using ESB in accordance with an illustrative embodiment.

With reference to FIG. 3, this figure depicts a block diagram of example configuration for service failover and fallback using ESB in accordance with an illustrative embodiment. Location 302, labeled "location A" and location 332, labeled "location B" are example geographical areas, security zones, or network domains, such as network domains 132 and 142 in FIG. 1. Gateway 304 is an example of gateway 134 in FIG. 1 and Gateway 334 is an example of gateway 144 in FIG. 1.

ESB 330 can include any number of interconnected gateways, such as gateways 304 and 334, providing secure zone to zone communications across one or more firewalls, such as firewall 331. Gateways, such as gateways 304 and 334, receive web service requests from consumers, such as 308 and 338, and route the requests to web service providers, such as providers 306 and 336, in different geographies and security zones, such as locations 302 and 332, using virtualized service addressing. Provider 336 is a redundant web service provider implemented as a backup cluster for corresponding primary cluster of provider 306. Each of registry 310 and 340 is a mechanism in their respective locations for registering the location and hostnames of the primary and backup clusters including but not limited to providers 306 and 336.

Gateways 304 and gateway 334 include gateway processing logic (not shown) that detects failures when routing requests to a web service provider. Gateways 304 and gateway 334 further include a mechanism (not shown) for describing the lifespan of a failover operation. A lifespan of a failover operation is a specified time period that begins at a time when the function of providing a service from primary provider 306 is failed over to backup provider 336, and upon the end of that specified time period, primary provider 306 resumes the function of providing the service. The lifespan of the failover is also called TTL. A TTL can be associated with a failure event that gives rise to a failover operation.

Gateways 304 and gateway 334 include a mechanism (not shown) for recording and discovering communication failure events for a specific web service provider to and from event logs 312 and 342, respectively. Gateways 304 and gateway 334 further include gateway processing logic (not shown) that activates backup cluster path 360 to backup provider 336 when there are communication errors with non-expired failover TTLs against primary provider 306. Gateways 304 and gateway 334 further include gateway processing logic (not shown) that restores primary cluster path 362 after the failover lifespan has expired.

Operation of an embodiment is now described using labels "A" and "B" as shown in this figure for the clarity of the description. Primary provider A's application cluster in location A, services requests from consumers in locations A & B. For consumers in location B, gateway B—a multiprotocol gateway in location B, routes the request to gateway A—a multiprotocol gateway in location A, possibly through a firewall between locations. Processing of the requests from consumers A and B are described separately for the clarity of the description.

Processing of consumer A's request proceeds in one embodiment as follows—Consumer A sends a request to local multiprotocol gateway—gateway A, encoding the name of the requested web service in the request. Gateway A receives the request, extracts the web service name from the request, and retrieves the provider's failover TTL, location, and hostname of the primary and backup clusters from registry A. Gateway A retrieves communication failure events from event log A using the web service name in the request.

If gateway A detects no failure events, or if the event failover TTL associated with the primary provider has expired, gateway A sends the request to the service served from the primary provider, such as by using the hostname information of the primary provider cluster. If gateway A finds one or more failure events in event log A with corresponding one or more non-expired failover TTLs, gateway A sends the request to gateway B by using the location information of the backup provider cluster.

If a communication failure occurs while sending consumer A's request to the hostname of the primary provider cluster, gateway A creates a communication failure entry in the event log using the web service name and primary provider's failover TTL specified in registry A. Gateway A then returns an error response to Consumer A.

Processing of consumer B's request proceeds in one embodiment as follows—Consumer B sends a request to local multiprotocol gateway—gateway B, encoding the name of the requested web service in the request. Gateway B receives the request, extracts the web service name from the request, and retrieves the provider failover TTL, location, and hostname of the primary and backup provider clusters from registry B. Gateway B retrieves communication failure events, if any, from event log B using the web service name in customer B's request. If gateway B finds no failure events, or if the event failover TTLs have expired, gateway B sends the request to Gateway A by using the location information of the primary provider cluster. If gateway B finds one or more failure events with non-expired failover TTLs, gateway B sends the request to the service served from the backup provider, such as by using the hostname information of the backup provider cluster. If a communication failure occurs while sending the request to the hostname of the primary provider cluster, gateway B creates a communication failure entry in event log B using the web service name and provider failover TTL from registry B. Gateway B then returns an error response to Consumer B.

In the case where Gateway B sends the request to Gateway A using the location information of the primary provider cluster, gateway A can return a communication error to gateway B when a failure event with a non-expired failover TTL exists in event log A for the requested web service name from the primary provider cluster hostname, or when gateway A receives a communication error while sending the request from gateway B to the primary provider cluster host name.

Under the above-described circumstances of generating a communication error entry from gateway A, gateway A sends the generated communication error to Gateway B. Receiving the communication error message from gateway A causes gateway B to trigger the event logging mechanism at gateway B, which enters a corresponding communication error entry in entry log B. In reality, no actual communication error exists between the two gateways, but this propagation of communication error message from location A to location B prevents gateway B from sending future requests for the same web service to gateway A within the failover TTL. The propagation uses existing back-channel communication method already in place between gateways A and B without requiring a new system for the propagation.

In one embodiment, communication errors occurring during web service request processing are used as the awareness mechanism. An embodiment employs no independent external mechanisms for determining the availability of the primary cluster. Following a failure of the primary cluster there will be at least one failed consumer request according to one embodiment. This failure of a consumer request is not unlike the failures that may occur in the existing DNS GSLB solution, but while numerous failures may occur in the DNS GSLB solution, an embodiment limits the total number of failed consumer requests to 1, or another significantly lower threshold. Where multiple gateways are involved in the end-to-end flow, an embodiment propagates the error condition quickly to the perimeter gateways, ensuring that all consumers of the failed web service experience a similar failure rate.

Figure 4A:
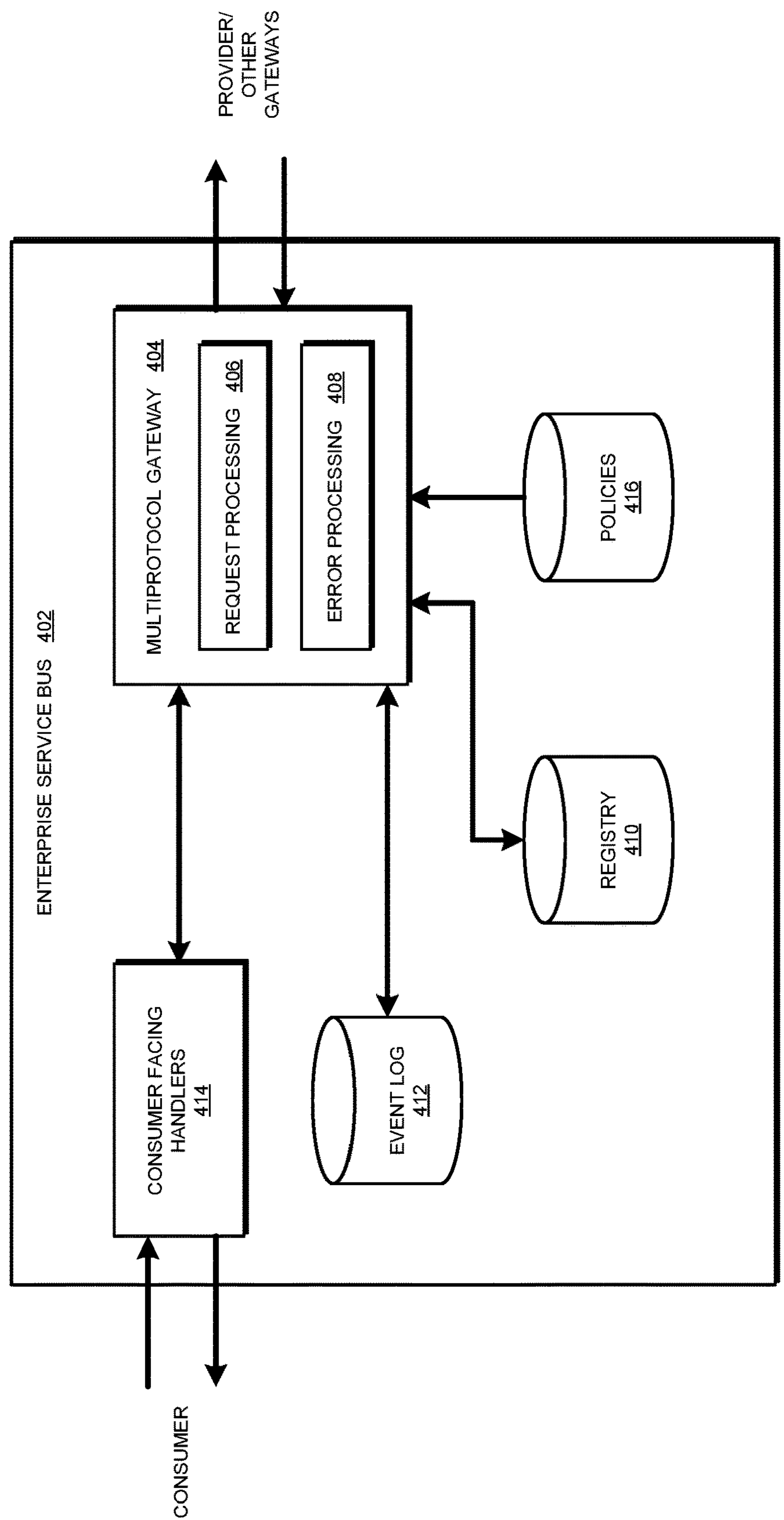
FIG. 4A depicts a block diagram of a configuration of a gateway in an ESB in accordance with an illustrative embodiment.

With reference to FIG. 4A, this figure depicts a block diagram of a configuration of a gateway in an ESB in accordance with an illustrative embodiment. ESB 402 is an example of ESB 330 in FIG. 3. Multiprotocol gateway (MPGW) 404 is an example of gateway 304 or 334. Registry 410 is an example of registry 310 or 340 in FIG. 3. Event log 412 is an example of event log 312 or 342 in FIG. 3.

An embodiment of MPGW 404 includes component 406 for request processing, and component 408 for error processing, as described elsewhere in this disclosure. The consumer side interface implementation is depicted as a separate component—consumer facing handlers 414. For example, one handler in consumer facing handlers 414 may be implemented for receiving service requests from consumers, such as consumer 308 or 338 in FIG. 3, over HTTP and HTTPS. Another handler in consumer facing handlers 414 can be implemented for receiving requests using another protocol.

Any number of handlers can be implemented within the scope of the illustrative embodiments for receiving service requests over multiple protocols, hence the name "multiprotocol gateway" for MPGW 404. A consumer makes a web service request by sending the request to one of consumer facing handlers 414 associated with MPGW 404. MPGW 404 processes the request and routes the request directly or indirectly to the primary or backup service provider, such as to provider 306 or 336 in FIG. 3.

Request processing component 406 receives a service request from a consumer facing handler, or another gateway in ESB 402. Error processing component 408 looks up the event log for connection errors. Depending on the presence or absence of the communication errors as detected by component 408, component 406 sends the request to a primary provider or a backup provider via one or more gateways. Component 408 performs the function of detecting errors in sending the request to a provider, making communication error entries in an event log, and propagating those entries to one or more other gateways in ESB 402.

ESB 402 employs policies repository 416, which includes a catalog of all the services available across ESB 402. The catalog may be constructed in any form suitable for a particular implementation without departing the scope of the illustrative embodiments. In one embodiment, registry 410 is a part of policies repository 416.

With reference to FIG. 4B, this figure depicts an example entry in a registry in accordance with an illustrative embodiment. Registry entry 420 is an example record in registry 410 in FIG. 4A.

Entry 420 describes an identifier, such as the URI, of the web service. Entry 420 further describes a security model, which identifies the authentication, authorization, and other special security requirements for accessing the identified service.

Entry 420 further includes primary address structure "primaryAddress" 422, which identifies the location and hostname of the primary service provider. The servedBy attribute names the ESB cluster typically "closest" to the hostname identified in the address node. Web service requests are forwarded from one ESB MPGW to the next as needed until the request reaches the servedBy cluster. Once at the servedBy cluster, the MPGW there sends the request to the URL contained in the address node.

Entry 420 may include other optional structures, such as for message mediation and logging, without departing the scope of the illustrative embodiments. Furthermore, entry 420 can be configured to enforce other limitations in the data processing environment, such as a maximum number of hops between a consumer and a provider that the request has to make before either the request is processed by a provider or an error is returned to the consumer. In one embodiment, a hop refers to the number of gateways that the request must pass through in the process of being handled by the ESB.

Entry 420 also describes the backup providers in other geographical areas, security zones, or network domains, corresponding to the primary providers according to structure 422. Failover Address structure "failoverAddress" 424 contains the servedBy location of the backup provider and the failover Time To Live, failoverTTL, attribute which is used by the ESB to trigger the failback mechanism from the backup provider of structure 424 to the primary provider of address 422. A failoverThreshold attribute in structure 424 is also optionally usable as shown to set a number of connection failures after which the failover to the backup provider of structure 424 should occur.

The configuration of entry 420 and structures 422 and 424 are depicted and described only as examples and not to imply a limitation on the illustrative embodiments. The names and placement of certain attributes are also examples that are non-limiting on the illustrative embodiments. Those of ordinary skill in the art will be able to construct other configurations, structures, names, and placements for similar purposes, and the same are contemplated within the scope of the illustrative embodiments.

Figure 4C:
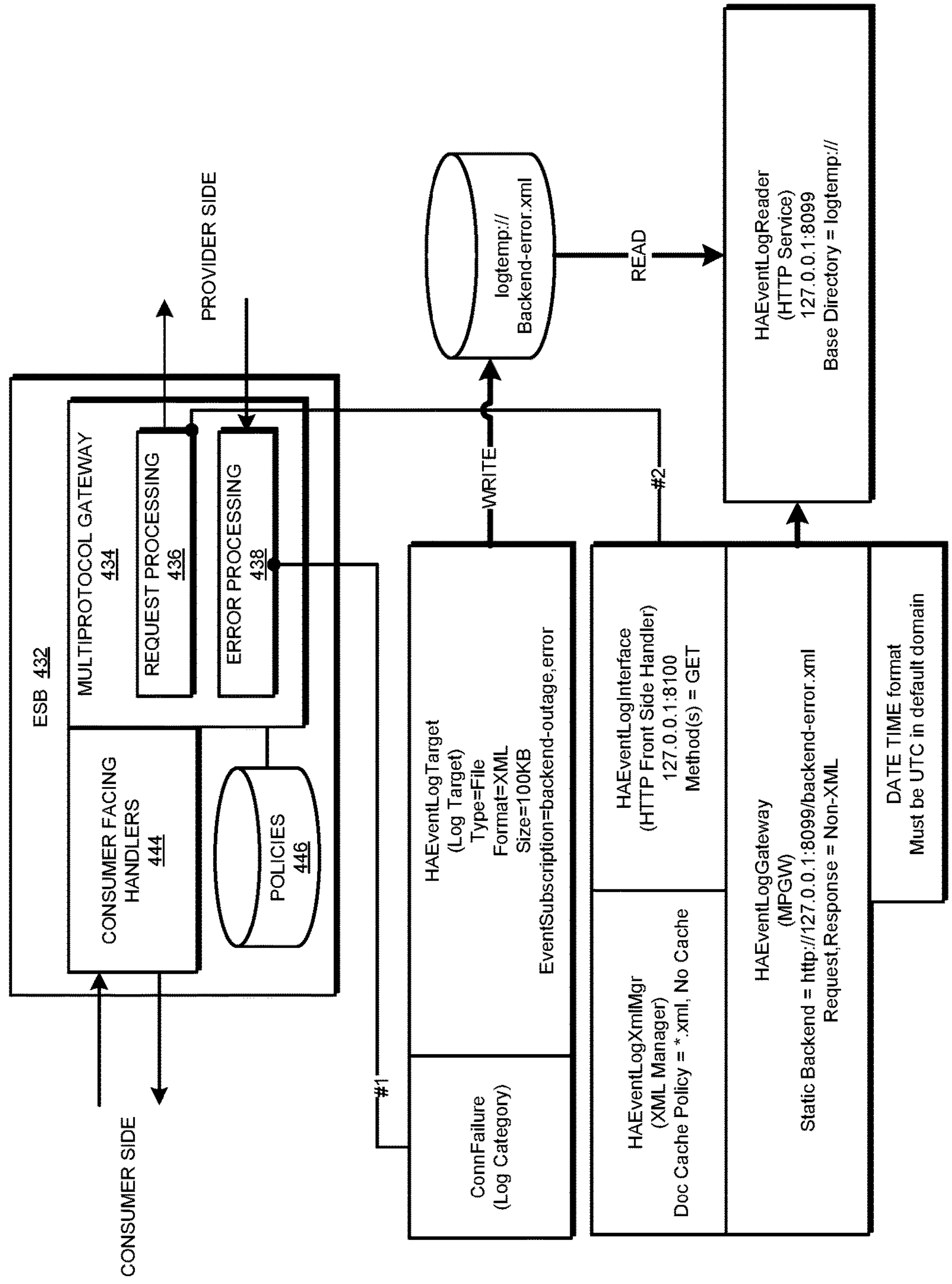
FIG. 4C depicts a block diagram of a process for providing the failover and failback functions in accordance with an illustrative embodiment.

With reference to FIG. 4C, this figure depicts a block diagram of a process for providing the failover and fallback functions in accordance with an illustrative embodiment. ESB 432 is an example embodiment of ESB 402 in FIG. 4A. MPGW 434 together with components 436 and 438 is an example embodiment of MPGW 404 with components 406 and 408, respectively, in FIG. 4A. Consumer facing handlers 444 is an embodiment of consumer facing handlers 414 in FIG. 4A. Policies 446 is an embodiment of policies repository 416 in FIG. 4A.

When problems arise in connections with a web service provider, the ESB error processing logic, such as component 438, categorizes the failure and, for certain failure types, creates a failure event in an event log for subsequent use. In one embodiment, as depicted, the HAEventLogTarget (Log Target) object implements a non-persistent in-memory event log that is used to record communication failure events.

The ConnFailure (Log Category) object implements the interface (#1 in FIG. 4C) between error processing component 438 and the event log. When connection errors occur on the provider side of ESB 432, error processing component 438 emits an event using logic 452 as shown in FIG. 4D. FIG. 4E depicts example event log entry 460 emitted to an event log using logic 452 of FIG. 4D.

When an error occurs on a connection with the provider, or with a downstream ESB device, such as another gateway, error processing component 438 is invoked. If the error-type matches a set of qualifying conditions as described with respect to FIG. 4D, and the connection failure occurred on the primary path, the ConnFailure event is emitted, and the error is returned to the consumer—the upstream side—of ESB 432.

When ESB 432 receives a consumer request for a service provider, it must determine whether the primary or backup path should be used to route the request. Request processing component 436 performs this determination on each request by retrieving and analyzing the contents of the event log.

In one embodiment, the interface to the event log is implemented as an HTTP interface on the localhost interface by the following components:

HAEventLogReader (HTTP Service),

HAEventLogGateway (Multiprotocol Gateway 434),

HAEventLogXmlMgr (XML Manager), and

HAEventLogInterface (HTTP consumer facing Handler 444).

HAEventLogReader (HTTP Service)—In one embodiment, the interface to the in-memory events created during error processing is provided by this example HTTP Service object. This object acts as a simple HTTP server, processing "get" requests and returning the content of files located in logtemp:///(in-memory) directory. The HTTP Service is not, however, called directly by request processing component 436. There are practical advantages of introducing a Multiprotocol Gateway to intermediate access to the event log.

HAEventLogGateway (Multiprotocol Gateway 434)—In one embodiment, multiprotocol gateway 434 is used to control the caching policy, via the HAEventLogXmlMgr (XMLManager) object, to ensure that request processing component 436 will have immediate access to the contents of the event log without suffering a cache refresh delay. (Doc Cache Policy=*.xml, No Cache)

MPGW 434, uses one or more consumer facing handlers 444's interfaces. The HAEventLogInterface (in an example implementation of HTTP consumer facing Handlers 444) is enabled on the private localhost (127.1.1.1:8100) Interface and configured to process HTTP "get" requests only. Both of these measures are taken to restrict object access to the intended application. Request processing component 436 accesses the event log (#2 in FIG. 4C), through this handler, using the following example syntax: <dp:url-open target="http://127.0.0.1:8100/backend-error.xml" response="binaryNode"/>

When a consumer request is received, the service URI is examined and used to retrieve the URI policy entry from policies 446. If failoverAddress is not defined in the policy, ESB 432 routes to the primaryAddress for single-location providers. If failoverAddress is defined, request processing continues by requesting the HA event log (e.g., backend-error.xml).

The event log is then searched for ConnFailure events against the service provider URI. When found, the event timestamp (date-time), current time, and failoverTTL are used to increment a failureEvent count. The failureEvent count is used with the failoverThreshold attribute (contained in the policy) to determine if the primary or failover address should be used. The failoverThreshold attribute helps avoid frequent failover/failback cycles when, for example, a low quality connection to the primary and backup providers must be accommodated.

If failoverThreshold is exceeded, and the request is from a consumer application, ESB 432 simply routes the request to the failoverAddress and performs response portion of the request processing or error processing as appropriate.

In the case of a request arriving from an upstream ESB device or application, such as another gateway, the request processing behavior changes. The request processing component in the ESB device or application, such as the gateway that receives the request from the upstream ESB device or application, under certain conditions, will not route the request to either the primary or backup provider. The receiving ESB device or application will instead induce a "synthetic" communication error in the existing return communication channel with the upstream ESB device or application. An error of this type is used to propagate provider failure information to the periphery of the ESB.

With reference to FIG. 4D, this figure shows logic for emitting connection error entries from an ESB to an event log in accordance with an illustrative embodiment. Logic 450 is executed by component 408 in FIG. 4A or 438 in FIG. 4C.

When connection errors occur on the provider side of the ESB, logic 452 is executed, for example, by component 438, to make a log entry into an event log, such as in event log 312 or 342 in FIG. 3.

The example error conditions used in the logic 450, are as follows:

'0x01130006'—Failed to establish a backside connection,

'0x01130007'—Failed to establish backside connection,

'0x01130008'—Lost connection with backside server,

'0x01130009'—Dynamic backend host not specified,

'0x01130011'—Failed to process response headers,

'0x01130019'—Connection terminated before response headers read,

'0x0113001c'—Connection error,

'0x0113001e'—Backside URL invalid, and

'0x00c3001f'—No host header.

The example logic and the example error codes used therein are not intended to be exhaustive or limiting on the illustrative embodiments. Those of ordinary skill in the art will be able to construe from this disclosure other forms of similarly purposed logic and other codes for similar or additional purposes, and the same are contemplated within the scope of the illustrative embodiments. The example selection of failure events allows error processing component 438 in FIG. 4C to listen for those events that are indicative of an infrastructure problem, and to disregard problems that can be associated with the request itself, such as improper credentials or data formatting problems.

With reference to FIG. 4E, this figure depicts an example connection error event log entry generated by an error processing component in an ESB in accordance with an illustrative embodiment. Log entry 460 can be generated by error processing component 438 in FIG. 4C using logic 450 of FIG. 4D.

Portion 462 of log entry 460 depicts the date and time of the entry, along with a type of the entry. As depicted, portion 462 indicates that log entry 460 is a connFailure type of log entry as described elsewhere in this disclosure. Portion 464 contains the details of the message, including the identifier of the service that failed and a failoverTTL attribute associated therewith. Other attributes, such as failoverThreshold, could also be emitted in portion 464, without limitation.

Figure 5A:
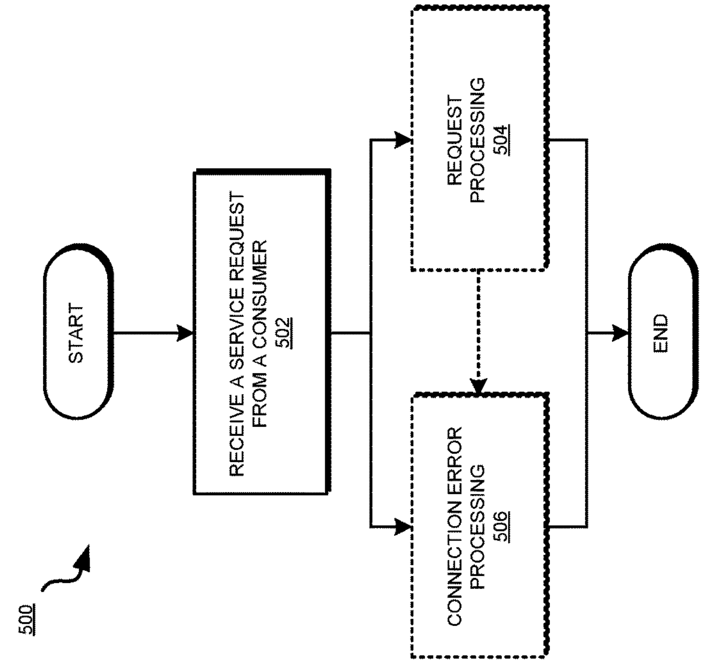
FIG. 5A depicts a flowchart of an example process of handling a web service request in an ESB in accordance with an illustrative embodiment.

With reference to FIG. 5A, this figure depicts a flowchart of an example process of handling a web service request in an ESB in accordance with an illustrative embodiment. Process 500 can be implemented in ESB 402 using handlers 414 and MPGW 404 in FIG. 4A or ESB 432 using handlers 444 and MPGW 434 in FIG. 4C.

An ESB, such as ESB 402, begins by receiving a service request from a consumer, such as by using a consumer facing handler in the ESB (step 502). ESB 402 is either able to process the request (step 504), or able to find a connection error whose associated TTL has not yet expired, causing connection error processing to initiate (step 506). Alternatively, ESB 402 can also begin processing the request and encounter an error during the processing, resulting in a combination of steps 504 and 506. ESB 402 ends process 500 thereafter. As an example, request processing components 406 or 436 in FIGS. 4A and 4C, respectively, can be used for executing step 504, and error processing components 408 or 438 in FIGS. 4A and 4C, respectively, can be used for executing step 506, as described elsewhere in this disclosure.

Figure 5B:
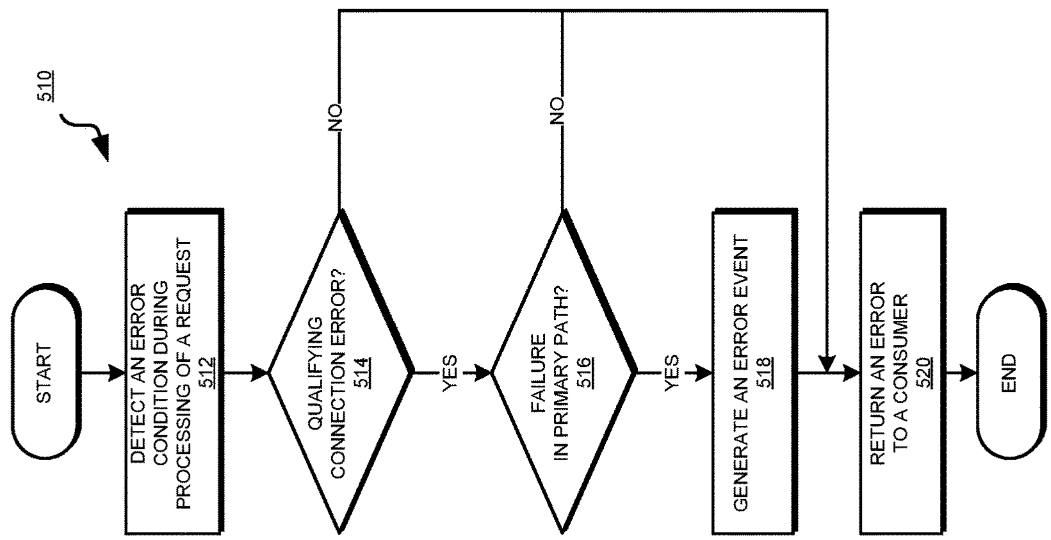
FIG. 5B depicts a flowchart of an example connection error processing in accordance with an illustrative embodiment.

With reference to FIG. 5B, this figure depicts a flowchart of an example connection error processing in accordance with an illustrative embodiment. Process 510 can be implemented in error processing components 408 or 438 in FIGS. 4A and 4C, respectively. Process 510 can be implemented as the combination of steps 504 and 506 in process 500 of FIG. 5A.

An error processing component, such as error processing component 408, begins by detecting an error during the processing of a request, such as the request received in step 502 in FIG. 5A (step 512). Error processing component 408 determines whether the error is a qualifying connection error (step 514). For example, error processing component 408 may use the logic 450 in FIG. 4D, and the error code examples described therein for making the determination of step 514.

If the detected error is a qualifying connection error ("Yes" path of step 514), error processing component 408 determines whether the failure is in the primary path, such as path 362 in FIG. 3 (step 516). If the failure is in the primary path ("Yes" path of step 516), error processing component 408 generates an error event (step 518). As a part of generating the error event, error processing component 408 logs the error event as a connection error in the primary path in an event log.

Error processing component 408 returns an error to the consumer who sent the request (step 520). Error processing component 408 ends process 500 thereafter. If the detected error is not a qualifying connection error ("No" path of step 514), or if the failure is not in the primary path ("No" path of step 516), Error processing component 408 proceeds to step 520 and ends process 510 thereafter.

Figure 5C:
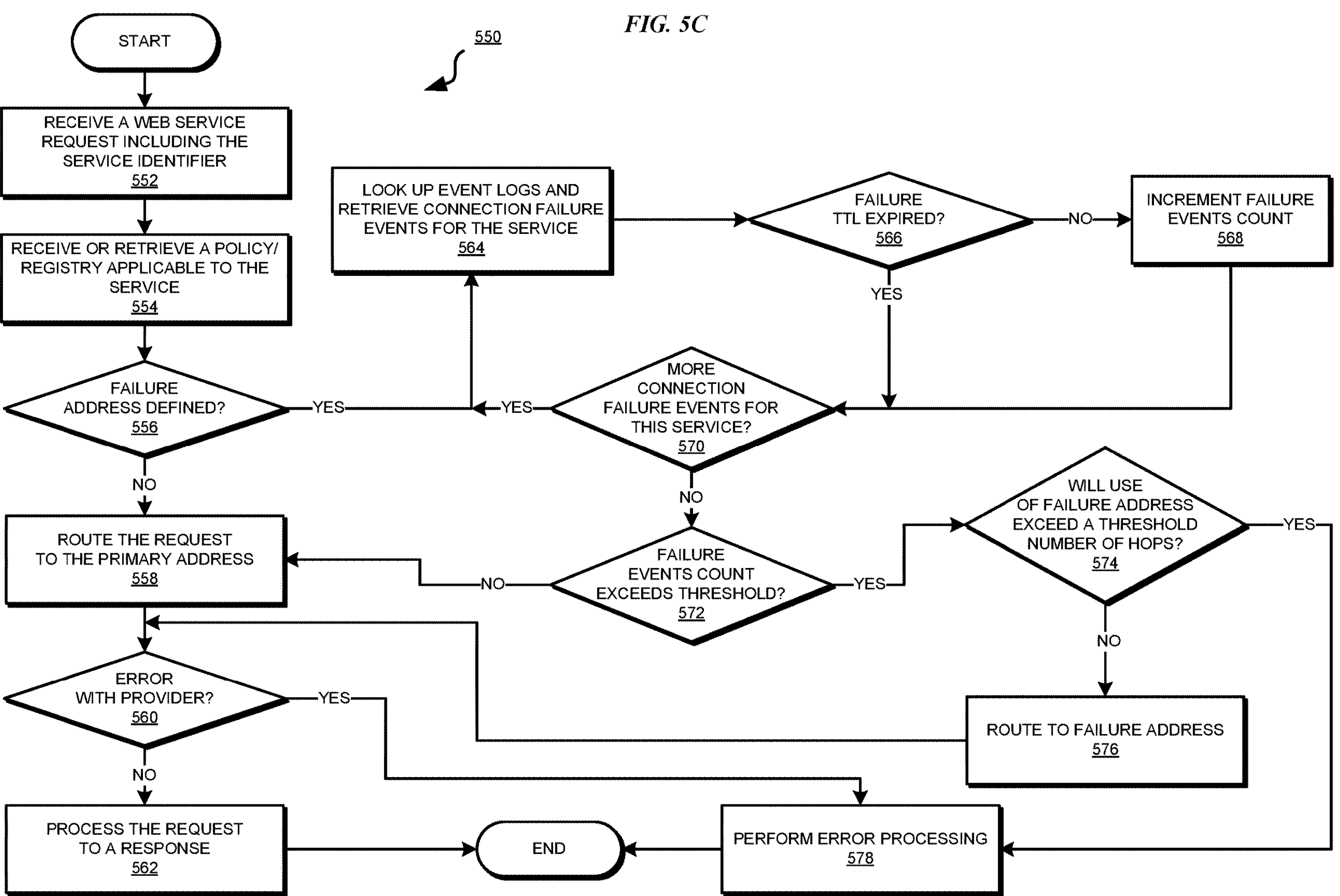
FIG. 5C depicts a flowchart of an example process for service failover and failback using ESB in accordance with an illustrative embodiment.

With reference to FIG. 5C, this figure depicts a flowchart of an example process for service failover and failback using ESB in accordance with an illustrative embodiment. Process 550 can be implemented in an ESB, such as ESB 402 or 432 in FIG. 4A or 4C, respectively. For example, process 550 can be implemented in gateway 404 or 434 in FIG. 4A or 4C, respectively.

an ESB, such as ESB 402, begins by receiving a web service request from a consumer, the request including an identifier of the requested service (step 552). This step is analogous to step 502 in FIG. 5A. ESB 402 retrieves a policy, such as a registry entry in registry 310 in FIG. 3, or a registry entry in registry 410, which may be a part of policies repository 416 in FIG. 4A (step 554).

ESB 402 determines whether a failover address is defined in the registry entry (step 556). If a failover address is not defined ("No" path of step 556), ESB 402 routes the request to the primary provider of the service using the primary address in the registry entry (step 558). Step 558 accommodates legacy registry entries for conventional routing of web service requests.

ESB 402 determines whether an error has been encountered in the processing of the request with the primary provider (step 560). If no error is encountered ("No" path of step 560), ESB 402 processes the request to generate a response for the consumer (step 562). ESB 402 may output (not shown) the response to the consumer or handoff (not shown) the response to another component, such as consumer facing handlers 414 in FIG. 4A. ESB 402 ends process 550 thereafter.

If a failover address is defined at step 556 ("Yes" path of step 556), ESB 402 looks up one or more event logs and retrieves a connection error event associated with the requested service (step 564). ESB 402 determines whether a failover TTL associated with the event has expired (step 566). If the failover TTL has not expired ("No" path of step 566), ESB 402 increments a "failure events" count ("failureEvents", which is compared to failoverThreshold as described with respect to FIG. 4B)(step 568). If the failover TTL has expired ("Yes" path of step 566), ESB 402 proceeds to step 570.

ESB 402 determines whether more connection failure events are available in an event log for the requested service (step 570). If more connection failure events are present ("Yes" path of step 570), ESB 402 returns to step 564.

If no more connection failures are present in the event logs ("No" path of step 570), ESB 402 determines whether the failure events count has exceeded a threshold, such as by comparing "failureEvents" attribute to "failureThreshold" attribute (step 572). If the failure events count has not exceeded the threshold ("No" path of step 572), ESB 402 returns to step 558 and routes the request to the primary provider. Returning to the primary provider in this manner is an embodiment of the failback mechanism of the illustrative embodiments.

If the failure count has exceeded the threshold ("Yes" path of step 572), ESB 402, optionally, determines whether using the failover provider at the failover address will result in exceeding a restriction, such as a threshold number of permissible hops in processing the request (step 574). If the restriction, e.g., the threshold number of hops, will not be exceeded or violated ("No" path of step 574), ESB 402 routes the request to the failure address for processing (step 576). ESB 402 then returns to step 560 for handling any errors with the failover provider. If an error is encountered with the provider, whether the primary provider or the failover provider ("Yes" path of step 560), ESB 402 proceeds to the error processing of step 578 and ends process 550 thereafter.

If the restriction, e.g., the threshold number of hops, will be exceeded or violated ("Yes" path of step 574), ESB 402 performs error processing, such as by using process 510 in FIG. 5B (step 578). ESB 402 ends process 550 thereafter. Optionally, ESB 402 may output (not shown) the error response to the consumer, or handoff (not shown) the error response to another component, such as consumer facing handlers 414 in FIG. 4A, or enter an event (not shown) in an event log. ESB 402 ends process 550 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for service failover and failback using ESB. An embodiment achieves rapid, and controllable, failover and failback without any dependence on, or modification of, consumer applications or operating systems and without dependence on complex DNS solutions or risky network exploitation techniques such as gratuitous ARP. An embodiment can significantly enhance the availability of high-volume and commodity web services delivered through an ESB principally by extension of the service virtualization concept to include the location and hostname of primary and backup web service endpoints. The described solution of an embodiment is transparent to the provider endpoints themselves and requires no additional hardware or software to operate other than what already exists in an ESB infrastructure. An embodiment provides a HA option for high-volume and commodity web service providers while maintaining legacy behaviors for all single cluster providers currently deployed in the ESB.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer-readable tangible storage device," "computer usable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for service failover and failback using Enterprise Service Bus (ESB), the method comprising:

determining, by a processor at a first data processing system, whether a failover provider system has been defined to provide a service that is requested in a request, wherein the service is a function of a provider system;

using, by the processor at the first data processing system, an event log record to determine whether a connection failure event occurred with the primary provider system of the service and whether a time period of using the failover provider system since the connection failure has expired, wherein the failover provider system can only process requests during the time period, and upon the expiry of the time period the primary provider system resumes processing requests;

evaluating, by the processor at the first data processing system, whether the request can be routed to the failover provider system; and routing, by the processor at the first data processing system, responsive to the evaluating being affirmative, the request to the failover provider system.

2. The method of claim 1, further comprising:

receiving, at a first data processing system, a request for a service, the service being a function of a primary provider system;

repeating, at the first data processing system, the receiving, the determining, the using, and the evaluating for a second request for the service; and routing the second request to the primary provider system responsive to the time period of using the failover provider system since the connection failure having expired.

3. The method of claim 2, further comprising:

detecting a connection error in processing the second request using the primary provider system; and logging a second connection failure event in an event log repository.

4. The method of claim 3, wherein the request is received by a first gateway located in a first security zone connected with the ESB, further comprising:

receiving, after detecting the connection error in the processing of the request using the primary provider system, the second request for the service, wherein the second request is received from a second gateway located in a second security zone connected with the ESB; and sending, using an existing channel for messaging between the first gateway and the second gateway, a connection error message from the first gateway to the second gateway, wherein the connection error message prevents the second gateway from sending a third request for the service to the first gateway within a specified time period.

5. The method of claim 1, further comprising:

repeating the determining, the using, and the evaluating for a second request for the service; and routing the second request to the primary provider system responsive to exceeding a threshold number of failure event count for using the failover provider system since the connection failure.

6. The method of claim 1, further comprising:

detecting a connection error in processing the request using the failover provider system; and logging a connection failure event about the connection error occurring with the failover provider system in an event log repository.

7. The method of claim 1, further comprising:

receiving, at the first data processing system, the request from a consumer application executing in a second data processing system, the request including the identifier of the service being requested, the identifier being usable at the first data processing system to identify the primary provider system of the service using a registry repository.

8. The method of claim 7, wherein the identifier is used to retrieve a registry record from the registry repository, the registry record identifying the primary provider system.

9. The method of claim 8, wherein the registry record includes an identifier of the failover provider system, and wherein the presence of the identifier of the failover provider system in the registry record causes an affirmative determination that the failover provider system has been defined to provide the service.

10. The method of claim 1, further comprising:

searching an event log repository to identify an event log record that is associated with the service and wherein the event log record is indicative of a connection failure event with the primary provider system; and retrieving the event log record from the event log repository.

11. The method of claim 1, wherein the primary provider system resumes processing requests upon the expiry of the time period when no other connection failure event with a corresponding unexpired time period remains associated with the primary provider system.

12. The method of claim 1, wherein the evaluating is responsive to:

(i) the failover provider system being defined, (ii) the connection failure event occurring with the primary provider system and (iii) the time period having expired but a threshold number of failure event count for using the primary provider system since the connection failure has also been exceeded.

13. The method of claim 12, wherein the step of evaluating is further responsive to:

(iv) an assessment that using the failover provider system since the connection failure will not cause a threshold number of hops for servicing the request to be exceeded.

14. The method of claim 1, wherein the evaluating is responsive to:

(i) the failover provider system being defined, (ii) the connection failure event occurring with the primary provider system and (iii) the time period not having expired.

15. The method of claim 14, wherein the step of evaluating is further responsive to:

(iv) an assessment that using the failover provider system since the connection failure will not cause a threshold number of hops for servicing the request to be exceeded.

16. A computer program product comprising one or more computer-readable storage devices and computer-readable program instructions which are stored on the one or more storage devices and when executed by one or more processors, perform the method of claim 1.

17. A computer system comprising one or more processors, one or more computer-readable memories, one or more computer-readable storage devices and program instructions which are stored on the one or more storage devices for execution by the one or more processors via the one or more memories and when executed by the one or more processors perform the method of claim 1.

18. A computer program product for service failover and failback using Enterprise Service Bus (ESB), the computer program product comprising one or more computer-readable storage devices and program instructions, stored on at least one of the one or more storage devices, the stored program instructions comprising:

program code to determine, by a processor at a first data processing system, whether a failover provider system has been defined to provide a service that is requested in a request, wherein the service is a function of a provider system;

program code to use, by the processor at the first data processing system, an event log record to determine whether a connection failure event occurred with the primary provider system of the service and whether a time period of using the failover provider system since the connection failure has expired, wherein the failover provider system can only process requests during the time period, and upon the expiry of the time period the primary provider system resumes processing requests;

program code to evaluate, by the processor at the first data processing system, whether the request can be routed to the failover provider system; and program code to route, by the processor at the first data processing system, responsive to the evaluating being affirmative, the request to the failover provider system.

19. A computer system for service failover and failback using Enterprise Service Bus (ESB), the computer system comprising one or more processors, one or more computer-readable memories and one or more computer-readable tangible storage devices, and program instructions, stored on at least one of the one or more storage devices for execution by at least one of the one or more processors via at least one of the one or more memories, the stored program instructions comprising:

program code to determine, at a first data processing system, whether a failover provider system has been defined to provide a service that is requested in a request, wherein the service is a function of a provider system;

program code to use, at the first data processing system, an event log record to determine whether a connection failure event occurred with the primary provider system of the service and whether a time period of using the failover provider system since the connection failure has expired, wherein the failover provider system can only process requests during the time period, and upon the expiry of the time period the primary provider system resumes processing requests;

program code to evaluate, by the processor at the first data processing system, whether the request can be routed to the failover provider system; and program code to route, by the processor at the first data processing system, responsive to the evaluating being affirmative, the request to the failover provider system.

* * * * *